US011649719B2

(12) United States Patent
Mohnke et al.

(10) Patent No.: US 11,649,719 B2
(45) Date of Patent: May 16, 2023

(54) COMPRESSING DATA COLLECTED DOWNHOLE IN A WELLBORE

(71) Applicants: Oliver Mohnke, Celle (DE); Yuri Vatis, Hannover (DE); Martin Errenst, Hannover (DE); Holger Tietjen, Hannover (DE)

(72) Inventors: Oliver Mohnke, Celle (DE); Yuri Vatis, Hannover (DE); Martin Errenst, Hannover (DE); Holger Tietjen, Hannover (DE)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 399 days.

(21) Appl. No.: 16/899,239

(22) Filed: Jun. 11, 2020

(65) Prior Publication Data

US 2020/0392836 A1 Dec. 17, 2020

Related U.S. Application Data

(60) Provisional application No. 62/860,358, filed on Jun. 12, 2019.

(51) Int. Cl.
*E21B 47/12* (2012.01)
*G05B 19/042* (2006.01)
(Continued)

(52) U.S. Cl.
CPC .............. *E21B 47/12* (2013.01); *E21B 44/00* (2013.01); *E21B 47/26* (2020.05); *G05B 19/042* (2013.01);
(Continued)

(58) Field of Classification Search
None
See application file for complete search history.

(56) References Cited

U.S. PATENT DOCUMENTS 5,519,668 A 5/1996 Montaron
6,932,167 B2 8/2005 Proett et al.
(Continued)

FOREIGN PATENT DOCUMENTS

CN 101640802 B 2/2010
CN 102946538 B 2/2013
(Continued)

OTHER PUBLICATIONS

Akkurt et al.; "Collaborative Development of a Slim LWD NMR Tool: From Concept to Field Testing"; Saudi Aramco Journal of Technology; Fall 2009; 14 Pages.
(Continued)

*Primary Examiner* — Saba Tsegaye
(74) *Attorney, Agent, or Firm* — Cantor Colburn LLP

(57) ABSTRACT

An example computer-implemented method for transmitting data from a downhole location to the earth's surface. The method includes sensing, with one or more sensors, sensor data downhole, the sensor data comprising a plurality of data value sets. The method further includes assigning at least one data value of each of the plurality of data value sets to each of a plurality of time levels or depth levels to generate a data block. The method further includes compressing, with a first processor in the drilling assembly, the data block by a block-based compression technique to generate compressed data. The method further includes transmitting, with a telemetry system, the compressed data from the downhole location to the surface. The method further includes decompressing, with a second processor at the surface, the compressed data to generate decompressed data values. The
(Continued)

method further includes controlling the drilling assembly based on the decompressed data values.

19 Claims, 9 Drawing Sheets

(51) Int. Cl.
  *E21B 47/26* (2012.01)
  *E21B 44/00* (2006.01)
  *H04N 19/176* (2014.01)
  *H04N 19/51* (2014.01)

(52) U.S. Cl.
  CPC .......... *H04N 19/176* (2014.11); *H04N 19/51* (2014.11); *G05B 2219/21109* (2013.01); *G05B 2219/25258* (2013.01)

(56) References Cited

U.S. PATENT DOCUMENTS

| | | | |
|---|---|---|---|
| 7,167,101 B2 | 1/2007 | Golla et al. | |
| 7,272,504 B2 | 9/2007 | Akimov et al. | |
| 9,866,835 B2 | 1/2018 | Gelman et al. | |
| 9,932,824 B2 | 4/2018 | Yu et al. | |
| 2007/0027629 A1* | 2/2007 | Hassan | G01V 11/002 702/11 |
| 2007/0223822 A1 | 9/2007 | Haugland | |
| 2012/0001776 A1* | 1/2012 | Yu | H03M 7/30 341/50 |
| 2012/0014452 A1* | 1/2012 | Maani | H04N 19/56 375/E7.243 |
| 2012/0169841 A1* | 7/2012 | Chemali | E21B 47/002 348/E7.001 |
| 2012/0197528 A1* | 8/2012 | Le | G01V 11/002 702/6 |
| 2012/0321209 A1 | 12/2012 | Le et al. | |
| 2014/0286538 A1 | 9/2014 | Yu et al. | |
| 2016/0290128 A1 | 10/2016 | Dugas | |
| 2017/0089195 A1 | 3/2017 | Yu | |
| 2017/0167247 A1* | 6/2017 | Gao | E21B 47/12 |
| 2017/0170842 A1 | 6/2017 | Sun et al. | |
| 2020/0241166 A1* | 7/2020 | Marsh | E21B 47/20 |

FOREIGN PATENT DOCUMENTS

| | | | | |
|---|---|---|---|---|
| CN | 103002280 B | | 3/2013 | |
| GB | 2437152 A | * | 10/2007 | .......... A61M 1/0049 |

OTHER PUBLICATIONS

International Search Report Issued in International Application No. PCT/US2020/037218 datd Sep. 25, 2020; 3 Pages.

Uthayakumar et al.; "A Survey on Data Compression Techniques: From the Perspective of Data Quality, Coding Schemes, Data Type and Applications"; Journal of King Saud University—Computer and Inforamtion Sciences; 2018; 22 Pages.

Written Opinion Issued in International Application No. PCT/US2020/037218 dated Sep. 25, 2020; 7 Pages.

"Licenses for Standards and Other Technology Platforms"; MPEGLA—The Standards for Standards; Retrieved Online from https://www.mpegla.com; 2021; 1 Page.

"Series H: Audiovisual and Multimedia Systems—Infrastructure of Audiovisual Services—Coding of Moving Video—Advanced Video Coding for Generic Audiovisual Services"; ITU-T; Telecommuncation Standardization Sector of ITU; H.264; May 2003; 282 Pages.

Juurlink et al.; "Scalable Parallel Programming Applied to H.264/AVC Decoding"; Springer Briefs in Computer Science; 2012; 12 Pages.

* cited by examiner

COMPRESSING DATA COLLECTED DOWNHOLE IN A WELLBORE

CROSS REFERENCE TO RELATED APPLICATIONS

This application claims the benefit of U.S. Provisional Application Ser. No. 62/860,358, filed on Jun. 12, 2019, the contents of which are incorporated herein in their entirety.

BACKGROUND

Embodiments described herein relate generally to downhole exploration and production efforts and more particularly to techniques for compressing data collected downhole in a wellbore.

Downhole exploration and production efforts involve the deployment of a variety of sensors and tools. The sensors provide information about the downhole environment, for example, by collecting data about temperature, density, saturation, and resistivity, among many other parameters. Borehole imaging can be performed to capture data such as formation resistivity imaging about the downhole environment, such as a formation of interest. Data captured downhole can be used to control aspects of drilling and tools or systems located in the bottom hole assembly, along the drillstring, and/or on the surface.

SUMMARY

According to one embodiment of the present disclosure, a method for transmitting data from a downhole location to the earth's surface is provided. The method includes conveying a drilling assembly to the downhole location, the drilling assembly including a drill bit to penetrate an earth formation and one or more sensors. The method further includes sensing, with the one or more sensors, sensor data downhole, the sensor data comprising a plurality of data value sets. The method further includes assigning at least one data value of each of the plurality of data value sets to each of a plurality of time levels or depth levels to generate a data block. The method further includes compressing, with a first processor in the drilling assembly, the data block by a block-based compression technique to generate compressed data. The method further includes transmitting, with a telemetry system in the drilling assembly, the compressed data from the downhole location to the earth's surface. The method further includes decompressing, with a second processor at the earth's surface, the compressed data to generate decompressed data values. The method further includes controlling the drilling assembly based on the decompressed data values.

According to another embodiment of the present disclosure, a method for transmitting data from a downhole location to the earth's surface is provided. The method includes conveying a drilling assembly to the downhole location, the drilling assembly including a drill bit to penetrate an earth formation and one or more sensors. The method further includes sensing, with the one or more sensors, sensor data downhole, the sensor data comprising an one or more images. The method further includes compressing, with a first processor in the drilling assembly, the one or more images by a video compression technique to generate compressed data. The method further includes transmitting, with a telemetry system in the drilling assembly, the compressed data from the downhole location to the earth's surface. The method further includes decompressing, with a second processor at the earth's surface, the compressed data by a video decompression technique to generate decompressed data values. The method further includes controlling the drilling assembly based on the decompressed data values.

According to another embodiment of the present disclosure, a system for transmitting data from a downhole location to the earth's surface is provided. The system includes a drilling assembly at the downhole location, the drilling assembly including a drill bit to penetrate an earth formation. The system further includes one or more sensors in the drilling assembly, the one or more sensors configured to sense sensor data downhole, the sensor data comprising a plurality of data value sets. The system further includes a first processor in the drilling assembly, the first processor configured to assign at least one data value of each of the plurality of data value sets to each of a plurality of time levels or depth levels to generate a data block and to compress the data block by a block-based compression technique to generate compressed data. The system further includes a telemetry system in the drilling assembly configured to transmit the compressed data from the downhole location to the earth's surface. The system further includes a second processor at the earth's surface configured to decompress the compressed data to generate decompressed data values.

According to another embodiment of the present disclosure, a system for transmitting data from a downhole location to the earth's surface is provided. The system includes a drilling assembly at the downhole location, the drilling assembly including a drill bit to penetrate an earth formation. The system further includes one or more sensors configured to sense sensor data downhole, the sensor data comprising one or more images. The system further includes a first processor in the drilling assembly, the first processor configured to compress the one or more images by a video compression technique to generate compressed data. The system further includes a telemetry system in the drilling assembly configured to transmit the compressed data from the downhole location to the earth's surface. The system further includes a second processor at the earth's surface configured to decompress the compressed data to generate decompressed data values.

BRIEF DESCRIPTION OF THE DRAWINGS

Referring now to the drawings wherein like elements are numbered alike in the several figures.

DETAILED DESCRIPTION

Figure 1:
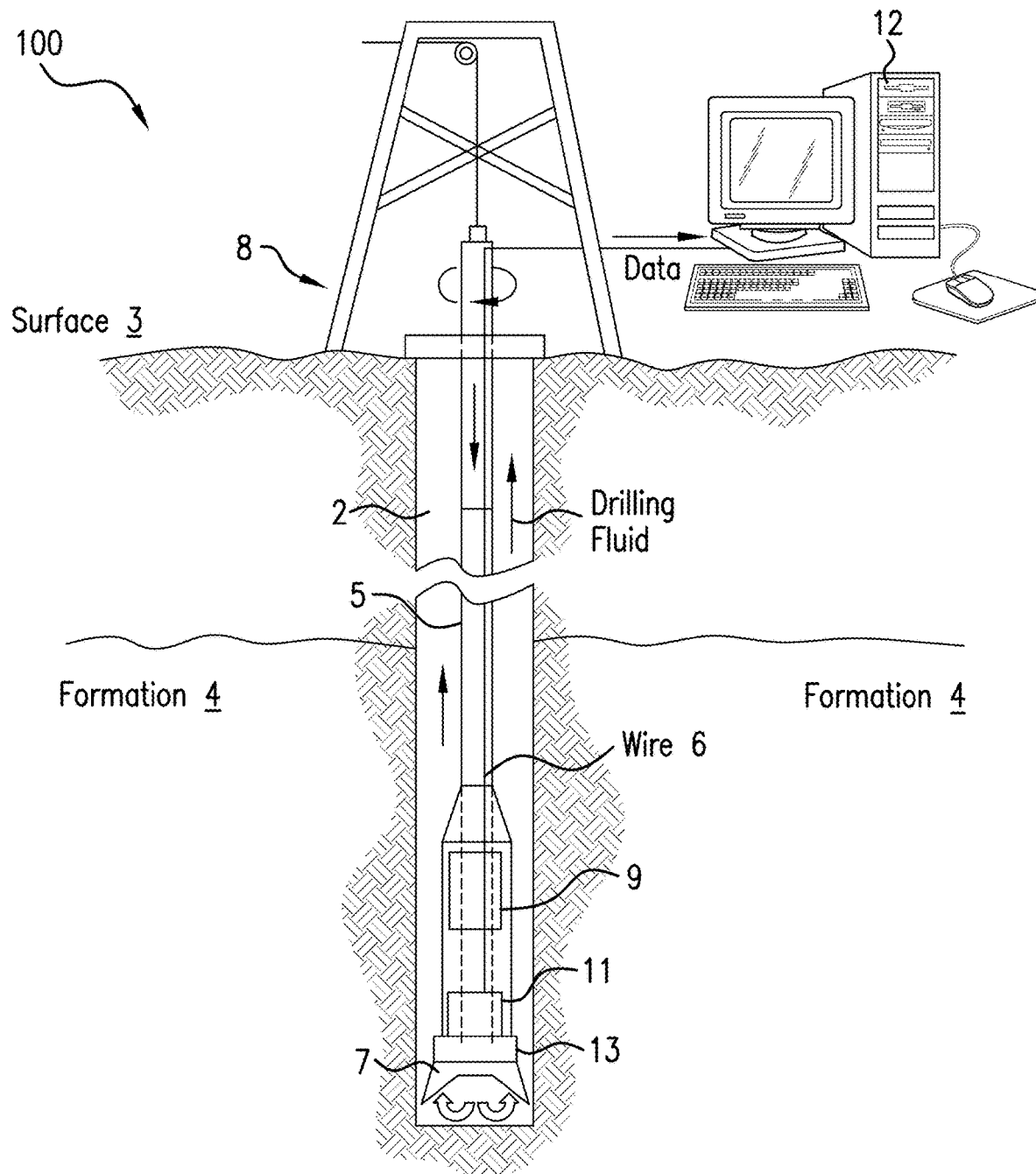
FIG. 1 depicts a cross-sectional view of a wellbore system according to one or more embodiments described herein.

Wellbores are drilled into a subsurface to produce hydrocarbons and for other purposes. Modern bottom hole assemblies (BHAs), such as those used during logging-while-drilling (LWD) operations and/or measurement-while-drilling (MWD) operations, include one or more tools for collecting downhole data in a wellbore. The collected downhole data can be images (e.g., density imaging, resistivity imaging, gamma ray (GR) imaging, etc.) or other data (e.g., nuclear magnetic resonance (NMR) echo-trains, multiple propagation resistivity data (MPR), spectral data, pump tests, acoustic traces and/or semblance maps, 2D-NMR data, etc.). The collected downhole data, are transmitted to the surface for processing, and results of the processing are used to control aspects of drilling and tools or systems located in the BHA, along the drillstring, and/or on the surface. For example, the downhole data are transmitted between the BHA and the surface via a powerline connecting the BHA to the surface (so-called wired pipe), via mud pulse telemetry, via electromagnetic telemetry, any combination thereof, or the like. FIG. 1 depicts a wellbore system 100 for implementing the techniques described herein.

In particular, FIG. 1 depicts a cross-sectional view of the wellbore system 100 according to one or more embodiments described herein. In traditional wellbore operations, LWD or MWD measurements are conducted during a drilling operation to determine formation rock and fluid properties of the formation 4. Those properties are then used for various purposes such as controlling and steering the drilling of the borehole 2, estimating reserves from saturation logs, defining completion setups, etc.

The system and arrangement shown in FIG. 1 is one example to illustrate the downhole environment. While the system can operate in any subsurface environment, FIG. 1 shows a carrier 5 disposed in a borehole 2 penetrating the formation 4. A drill bit 7 is disposed in the borehole 2 at a distal end of a carrier 5, as shown in FIG. 1.

According to the LWD/MWD embodiment, the carrier 5 is a drill string that includes a BHA 13. The BHA 13 is a part of a drilling rig 8 (also referred to as a "drilling assembly") and may include drill collars, stabilizers, reamers, motors, turbines, and the like, and a drill bit 7. The BHA 13 also includes sensors (e.g., measurement tools 11) and electronic components (e.g., downhole electronic components 9). The measurements collected by the measurement tools 11 can include measurements related to drill string operation, for example. The drilling rig 8 is configured to conduct drilling operations such as rotating the drill string and, thus, the drill bit 7. The drilling rig 8 also pumps drilling fluid through the drill string in order to lubricate the drill bit 7 and flush cuttings from the borehole 2. The measurement tools 11 and downhole electronic components 9 are configured to perform one or more types of measurements while performing LWD and/or MWD operations according to one or more embodiments described herein. In alternate embodiments, computing resources such as the downhole electronic components 9, sensors, and other tools can be located along the carrier 5 rather than being located in the BHA 13, for example. The borehole 2 can be vertical as shown or can be in other orientations/arrangements.

According to one or more embodiments described herein, data are collected by the measurement tools 11 and transmitted to the downhole electronic components 9 for processing. The data can be communicated between the measurement tools 11 and the downhole electronic components 9 by a wire 6, such as a powerline, which transmits power and data downhole. The data processed by the downhole electronic components 9 can then be telemetered to the surface via the wire 6, for example, by a telemetry system like a mud pulser, utilizing fluid pressure variations, or by an electromagnetic telemetry system utilizing electromagnetic waves, with telemetry techniques for additional processing or display by a processing system 12.

Figure 2:
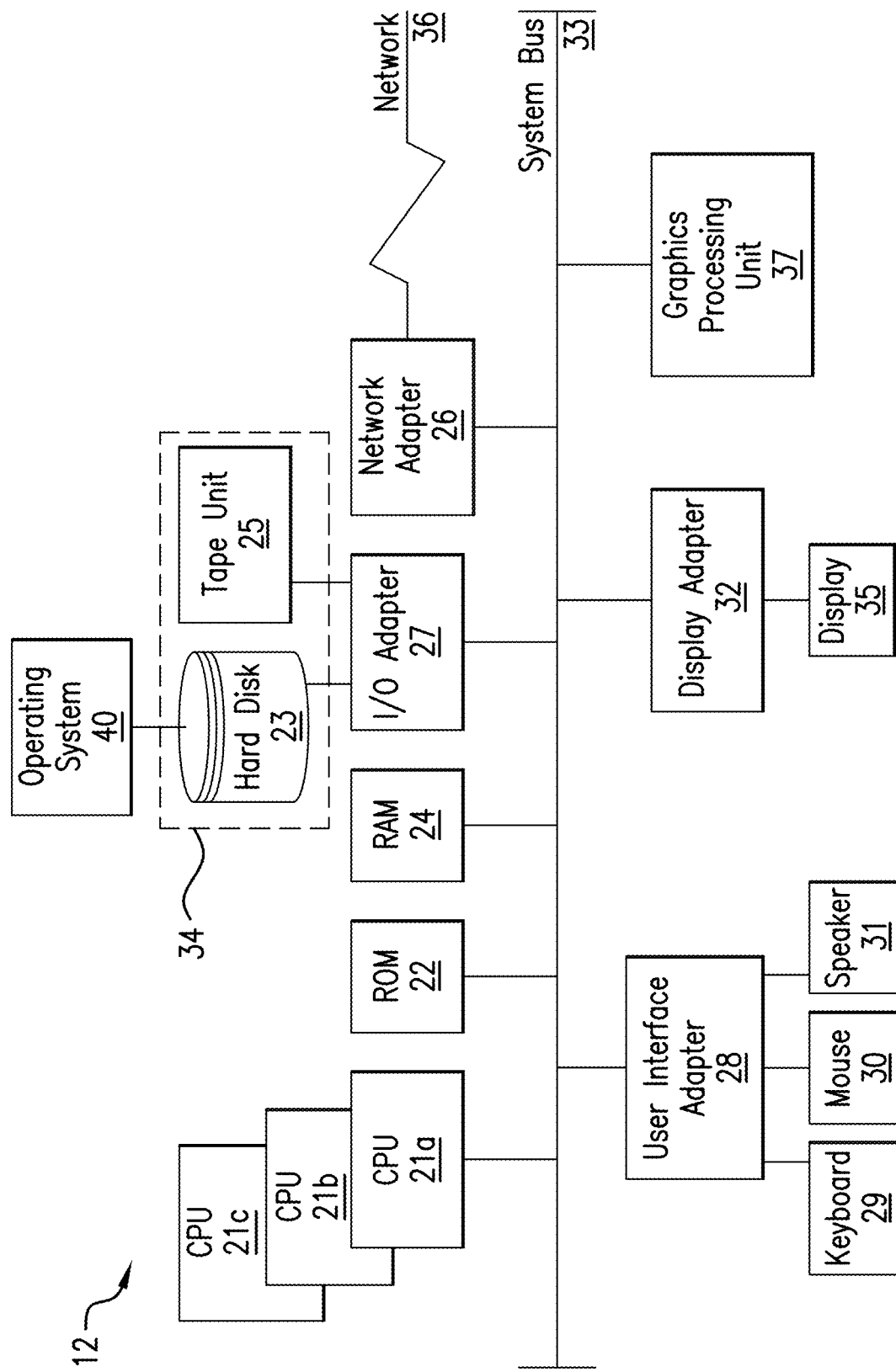
FIG. 2 depicts a block diagram of the processing system of FIG. 1, which can be used for implementing the present techniques according to one or more embodiments described herein.

It is understood that embodiments of the present disclosure are capable of being implemented in conjunction with any other suitable type of computing environment now known or later developed. For example, FIG. 2 depicts a block diagram of the processing system 12 of FIG. 1, which can be used for implementing the techniques described herein. In examples, processing system 12 has one or more central processing units (processors) 21a, 21b, 21c, etc. (collectively or generically referred to as processor(s) 21 and/or as processing device(s)). In aspects of the present disclosure, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 12.

Further illustrated are an input/output (I/O) adapter 27 and a network adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage drive 25 are collectively referred to herein as mass storage 34. Operating system 40 for execution on processing system 12 can be stored in mass storage 34. The network adapter 26 interconnects system bus 33 with an outside network 36 enabling processing system 12 to communicate with other such systems.

A display (e.g., a display monitor) 35 is connected to system bus 33 by display adapter 32, which can include a graphics adapter to improve the performance of graphics intensive applications and a video controller. In one aspect of the present disclosure, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

In some aspects of the present disclosure, processing system 12 includes a graphics processing unit 37. Graphics processing unit 37 is a specialized electronic circuit designed to manipulate and alter memory to accelerate the creation of images in a buffer intended for output to a display. In general, graphics processing unit 37 is very efficient at manipulating computer graphics and image processing and has a highly parallel structure that makes it more effective than general-purpose CPUs for algorithms where processing of large blocks of data are done in parallel.

Thus, as configured herein, processing system 12 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 12.

With continued reference to FIG. 1, drilling control signals can be generated by the processing system 12 and conveyed downhole, again via the powerline 6, mud pulse telemetry, etc., or can be generated within the downhole electronic components 9 or by a combination of the two according to embodiments of the present disclosure. The downhole electronic components 9 and the processing system 12 can each include one or more processors and one or more memory devices and can be configured to encode and/or decode data using the compression techniques described herein.

The downhole electronic components 9 and/or the processing system 12 can implement compression techniques described herein to encode and/or decode data. To do so, according to one or more embodiments described herein, the downhole electronic components 9 and/or the processing system 12 can include special-purpose hardware (e.g., application specific hardware, application specific integrated circuits (ASICs), application specific special processors (ASSPs), field programmable gate arrays (FPGAs), embedded controllers, hardwired circuitry, etc.) or as some combination or combinations of these. According to aspects of the present disclosure, the downhole electronic components 9 and/or the processing system 12 can implement the compression techniques described herein using a combination of hardware and programming. The programming can be processor executable instructions stored on a tangible memory, and the hardware can include a processing device (e.g., the CPU 21) for executing those instructions. Thus a system memory (e.g., RAM 24) can store program instructions that when executed by the processing device implement the compression techniques described herein.

Traditional data transmission techniques may not provide sufficient bandwidth to transmit the data between the downhole electronic components 9 and the surface 3. Accordingly, before the downhole data are transmitted to the surface, the downhole data are often compressed to reduce the size of the data transmitted to the surface. Advantageously, block-based compression techniques can be used for the compression. Block-based compression techniques can be applied on data that can be organized as so-called data blocks. Data blocks comprise M×N data values where each data value is assigned to one of M first data labels and one of N second data labels. Accordingly data blocks can be represented by data values matrices comprising M data block columns and N data block rows. This includes that the number M of different first data labels is a fraction of the number of the data values M×N and likewise for the N second data labels. One example is an image comprising M×N pixel, where the data values correspond to the color of a pixel and the first data label corresponds to the x-coordinate of the pixel and the second data label corresponds to the y-coordinate of the pixel Image compression techniques, such as a discrete cosine transform, a jpeg, or video compression techniques (i.e., compression techniques for a sequence of images), such as H.264, H.265, and the like, are used to compress the block-based data to reduce the number of bits that is required to represent the image. However, the first and second data labels are not limited to coordinates or other location specific information. As a non-limiting example, the second data label may be a number N of depth or time levels and the first data level M refers to associated information, such as information related to the acquisition of the M×N data values, such as, sensors, sensor types, measurement conditions, such as operating frequency, transmitter-receiver distances, a toolface angle at the time of the acquisition of the data value, or a running number for a series of consecutively acquired data values, a time or a time interval, etc. For example, in one non-limiting example, the first data label may include M different time levels (time1, time2, time3, . . . , timeM) and the second data label may refer to N different sensors that were used to acquire the data values (sensor1, sensor2, sensor3, . . . , sensorN). The data values can then be organized in the form (DataValue11, DataValue12, DataValue13, . . . , DataValue21, DataValue22, . . . DataValueMN), where DataValueIJ is associated with timeI and sensorJ. Data blocks comprising M×N data values where each data value is assigned to one of M first data labels and one of N second data labels wherein at least one of the first and second data labels is not related to coordinates or other location specific information are called pseudo-images. Sometimes, the data acquired by various sensors, sensor types, or measurement conditions, etc. are plotted separately by connected or interpolated data points, so that data values with different labels appear as different lines commonly referred to as "curves".

However, compressing the downhole data causes latency between when the data are collected and when the data are received at the surface. Existing compression techniques, such as H.264, H.265, and others, take time to compress the data, increasing the compression-related latency between when the data are collected and when the data are received at the surface. In addition, block-based compression techniques, such as H.264, H.265 do need to acquire an amount of data values before they can send the compressed data packages. In block-based compression techniques, the data packages are organized in so-called data blocks. The compressed data block that is sent to the surface includes data values that were acquired some time before the compression of the data block is finalized. Drilling decisions based on the data can consequently lag behind due to the latency including the compression-related latency, where the compression-related latency is created at least by processing or encoding time as well as by the time that is required to acquire the complete block of data that is compressed. It is desirable to reduce the latency in order to reduce the time to react in response to the data received at the surface, or to improve drilling operations and other energy industry operations.

Embodiments of the present invention are directed to a modified approach to traditional block-based compression techniques (e.g., H.264/AVC (Advanced Video Coding), H.265 video compression, etc.). In particular, the present techniques accommodate encoding and decoding of small static or dynamic data packages for real-time transmission of logging while drilling data that have a compression-related latency less than a compression-related latency caused using traditional compression techniques. H.264 compression is an example of a block-based compression technique that divides larger data blocks into small square blocks called "macroblocks," and encoding is applied at the macroblock level rather than to large data blocks. However, existing macroblock-based encoding causes high compression-related latency due to the delay between recording and encoding the full macroblock (e.g. 16×16 pixels or data values) and transmission of data to the surface, as described with reference to FIG. 3. This results in a latency or time lag between the time when the data were acquired and the time when uphole surface equipment receives the data (e.g., by using mud pulse telemetry).

According to one embodiment of the present disclosure, a method for data compression is disclosed. The method includes capturing data downhole in a wellbore. The method further includes encoding, by a processing system, the data by applying a block-based compression technique using basic data blocks of M data values by N data values, aka M×N data points, where M is a number of labels that each of the data values is associated with and N is a number of depth or time levels that each of the data values is associated with. The term depth level/time level within the context of this application refers to any depth/time related information such as, but not limited to, discrete depths/times (e.g. depth or time stamps), or depth/time intervals. The labels may be textual or numeric information and can refer to any kind of associated information, such as, but not limited to, sensors, sensor types, measurement conditions, such as operating frequency, transmitter-receiver distances, a toolface angle at the time of the acquisition of the data value, or a running number for a series of consecutively acquired data values, a time or a time interval, etc. Such information may define data value sets. For example, data values that were acquired by the same sensor or the same sensor type may define one data value set. Data values that were acquired under the same particular measurement condition may define another data value set. Data values that were acquired at the same time or within the same time interval from one or more time reference points may define still another data value set, etc. Sometimes, the data acquired by various sensors, sensor types, or measurement conditions, etc. is plotted separately by connected or interpolated data points, so that data values with different labels appear as different lines commonly referred to as "curves." The method further includes transmitting, by the processing system, a bit stream representing the compressed data block to a remote processing system at a surface of the wellbore. The method further includes decoding, by the remote processing system, the bit stream representing the compressed data block. The method further includes controlling a drilling assembly based on an analysis of the decoded bit stream representing the data block.

According to another embodiment of the present disclosure, a system is disclosed that includes a memory comprising computer readable instructions, and a processing device for executing the computer readable instructions for performing a method for data compression. The method includes generating, by the processing device, data packages comprising data values, each associated with one of A labels and B time or depth levels, the data package being in the form of a data block A×B, where A is the number of labels and B is a number of time or depth levels. The method further includes encoding, by the processing device, the data block by applying a block-based compression technique. The method further includes transmitting, by the processing device, a bit stream representing the encoded data block to a remote processing system at a surface of a wellbore. The method further includes decoding, by the remote processing system, the bit stream representing the encoded data block.

The method further includes controlling a drilling assembly based on an analysis of the decoded bit stream representing the data block.

Figure 3:
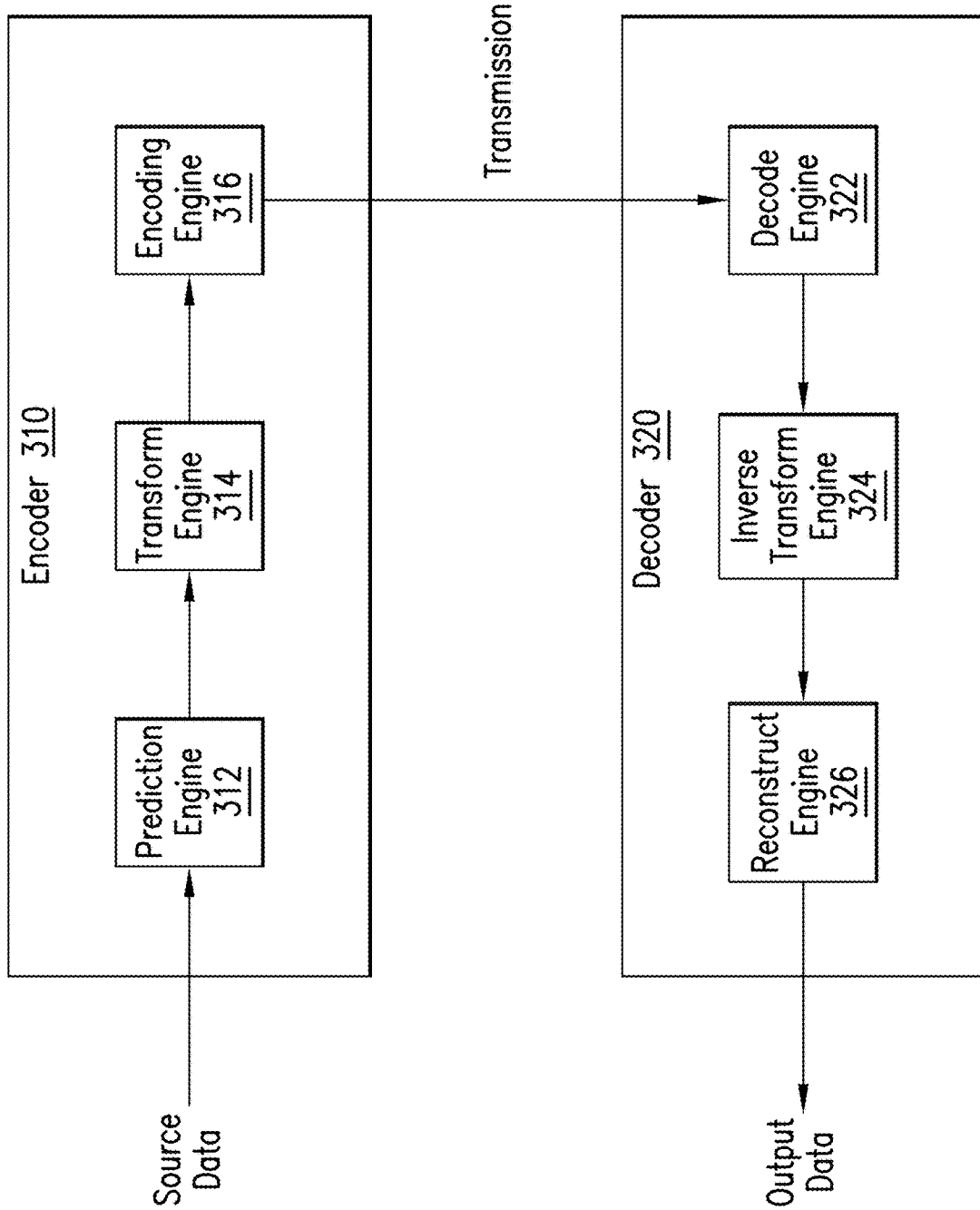
FIG. 3 depicts a block diagram of data compression using an encoder and a decoder, which can implement the techniques described herein.
Figure 4:
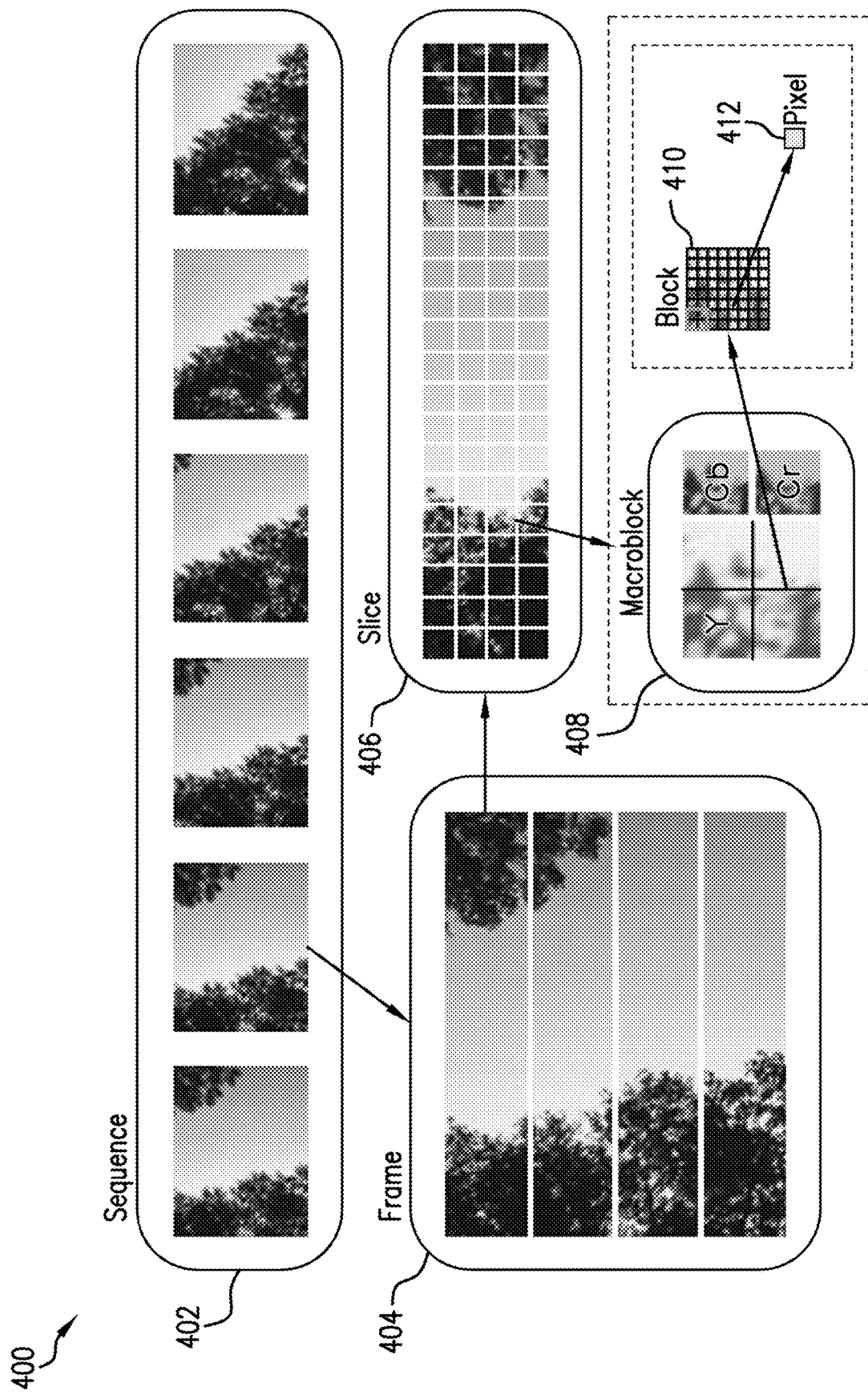
FIG. 4 depicts an example of source data divided into macroblocks and blocks.

FIG. 3 depicts a block diagram of a data compression system using an encoder 310 and a decoder 320. Typically, in LWD/MWD applications, the encoder 310 is downhole while the decoder 320 is at the surface. Source data, such as data blocks (e.g., frames of a video, M×N data values associated to N time or depth levels and M curve labels) are input into the encoder 310, which encodes the source data by performing prediction, transformation/quantization, and encoding. An example of source data is depicted in FIG. 4. In the example of FIG. 4, the source data 400 includes a sequence 402 of frames 404, which are further divided into slices 406 of macroblocks 408. The macroblocks 408 are further divided into blocks 410 that are a group of pixels 412, i.e. small rectangular areas associated to a small x-coordinate interval (i.e. small horizontal axis interval) and a small y-coordinate interval (i.e. small vertical axis interval). The smallest size of an image/frame that can be processed using Advanced Video Coding, such as H.264, is 16×16 pixels (i.e., one macroblock). The term "pixel" also refers to data values of block-based data that are not images (e.g., for a pseudo-image) as described in more detail herein. The data values can include individual values, such as integers, or several values, such as vectors or matrices. For example, in traditional compression techniques of visual images, the data values of each pixel may comprise "luma" (Y) and "chroma" (Cb and Cr) data referring to luminescence and color information, respectively.

With continued reference to FIG. 3, a prediction engine 312 processes a frame of the source data in units of a macroblock. The prediction engine 312 forms a prediction of the macroblock using motion prediction, such as intra-frame prediction (based on the current frame) and/or inter-frame prediction (based on a previously coded frame). For example, H.264 compression reduces transmitted bit sizes by exploiting similarities (spatial and temporal) of neighboring frames using intra-frame and inter-frame prediction, respectively. The transform engine 314 performs a transform (e.g., a discrete cosine transform), such as a 4×4 or 8×8 integer transform and quantizes the output of the transform.

Results from the transform engine 314 are encoded as a bit stream by the encoding engine 316. The bit stream is transmitted to the decoder 320, which uses a decode engine 322, an inverse transform engine 324, and a reconstruct engine 326 to decode the transmission and generate output data.

The encoder 310 encodes the source data by encoding the whole macroblock (i.e., 16-pixel by 16-pixel) or portions thereof referred to as "blocks". For example, if a macroblock is defined as a 16×16 data block, the encoder 310 may encode sixteen 4×4 data blocks (referred to as "4×4 blocks"), four 8×8 data blocks (referred to as "8×8 blocks"), or one 16×16 data block (i.e., the entire macroblock, referred to as "16×16 blocks"). For each encoding scheme, the compression efficiency (e.g. the compression ratio) may be different. The encoder may find the optimum compression efficiency and choose the corresponding encoding scheme based on this information. Thus, even when encoding all blocks as 4×4 blocks, a compression-related latency corresponding to 16 data block rows exists because until the encoding is performed on each of these block sizes, the compressed data are not transmitted.

To reduce this compression-related latency, the present techniques redefine the macroblock definition to a smaller size, such as but not limited to 4×4. This enables encoding and transmission of the coded data after four data block rows reducing the compression-related latency to four times the time that is needed to acquire a data block row of data. For example, if the sensor has an update rate according to a measurement interval and the measurement interval corresponds to the distance of time levels used to define the data block rows, the compression-related latency is lower than 16 times the measurement interval. Reducing the compression-related latency is critical to transmit that data to the surface and to receive the data at the surface as early as possible to allow a maximum amount of time to react to the data that is received at the surface. For example, if the second data label is a time level corresponding to the time of data value acquisition and the distance between data block rows is 25 seconds (s), and the macroblock is defined by 16×16, the compression-related latency that is created by the encoding is at least 16×25 s=400 s. In case the macroblock is defined by 4×4, the compression-related latency that is created by encoding is only 4×25 s=100 s. Thus, the data is available on surface 300 s or 5 minutes earlier which gives 5 minutes more to react to the data. For example, if the data is related to the drilling path and indicates that the well trajectory deviates from the planned well path, counter actions can be taken up to 5 minutes earlier which can reduce the damage that is created by the deviated well trajectory, tremendously. As another example, if the data is formation evaluation data and indicates that the well enters a new formation, counter actions (such as stopping, changing mud properties, adjust drilling direction) can be taken up to 5 minutes earlier which again can reduce the damage that is created by entering the new formation. It is important to note, that in compression schemes of visual videos or images, the reduction of latency is usually not an issue. For most applications, in video or image compression schemes, the update rates for sensors acquiring the data is usually significantly higher compared to the sensor update rates in LWD/MWD applications and therefore, the compression-related latency that is created by the encoding and that corresponds to a plurality of sensor acquisitions does not impact the results in contrast to LWD/MWD applications. Accordingly, the present techniques reduce compression-related latency as compared to H.264 compression, for example, by encoding frames in smaller block sizes (e.g., 4×4 blocks instead of 16×16 blocks). Moreover, the present techniques may reduce processing resources utilized by the encoder 310 because, due to the nature of the images acquired downhole, temporal aspects of the images can be ignored, unlike H.264 compression. For example, the prediction engine 312 may only apply intra-frame prediction and not inter-frame prediction of the data.

Figure 5:
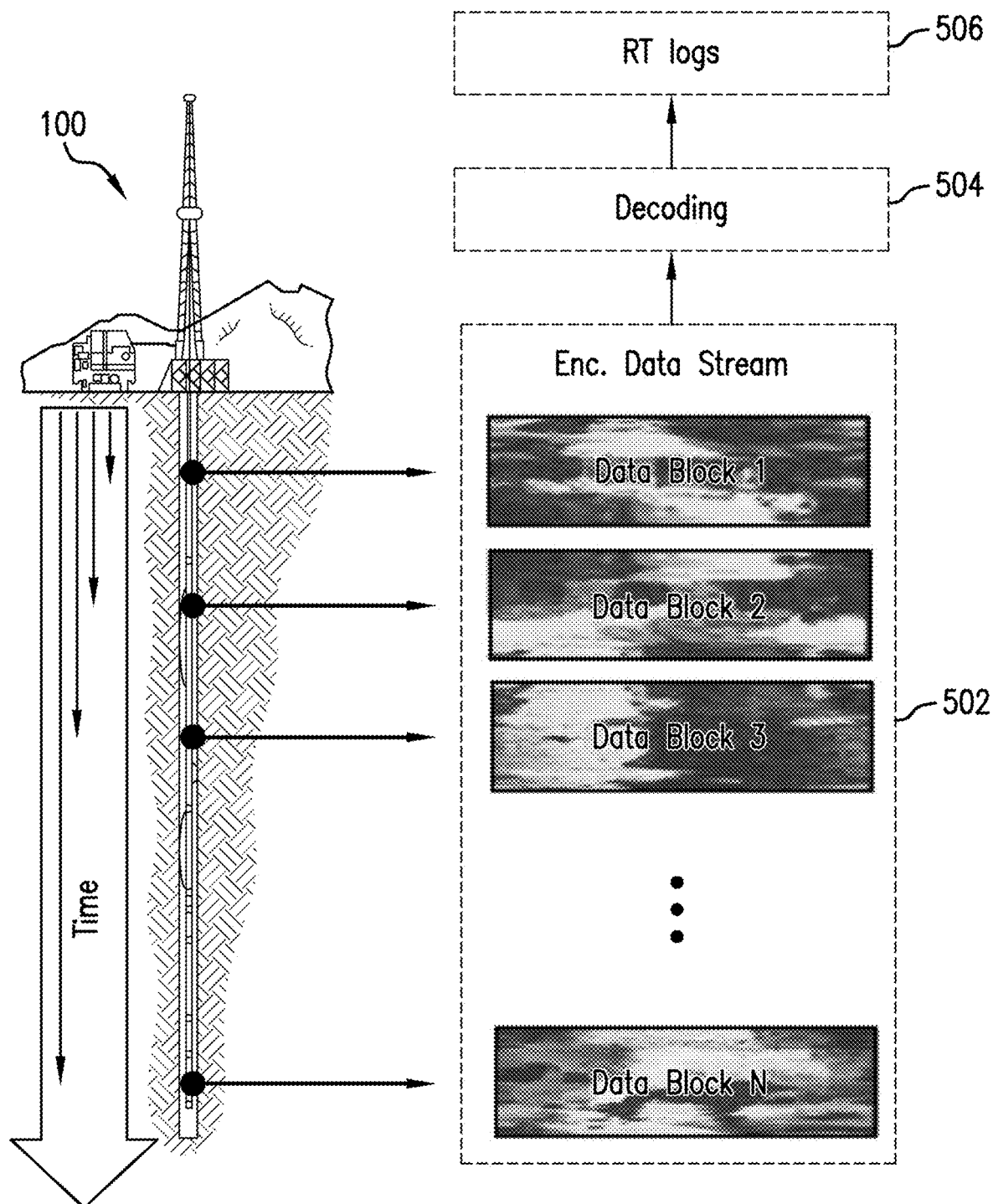
FIG. 5 depicts the wellbore operation of FIG. 1 utilizing the compression techniques according to one or more embodiments described herein.

FIG. 5 depicts the wellbore system 100 of FIG. 1 utilizing the compression techniques according to one or more embodiments described herein. Logging images (e.g., density, GR, resistivity, acoustic, etc.) or other data (e.g., NMR echo-trains, MPR, acoustic wave traces, semblance data, spectra, etc.) are assembled in principal block-based data packages (such as pseudo-images), with the size of M×N, where M is the number of data levels, such as curves/image-sectors and N is the number of depth or time levels included in the block-based data packages. M and N may be predefined and distributed to both the surface and the downhole location before the drilling assembly is conveyed into the borehole. M and N may also be calculated downhole based on an optimization algorithm that optimizes compression-related latency and compression efficiency, for example optimizes compression-related latency and/or compression efficiency for each data block or a group of data blocks, separately. The numbers M and N may then be added to the data block or the group of data blocks for instance by a data header to a data block and may be transmitted from downhole to the surface together with or separate from the data block. To keep the compression-related latency reasonably low, M and N may be chosen to meet the condition M≥N. However, in some examples, encoding can be performed on data blocks where N≤M, for example data blocks of 8 time or depth levels but only M=4 curves (i.e., 4×8). In one non-limiting example, the number N of depth or time levels included in the block-based data packages is equal to eight (M×8), such as 8×8. In another non-limiting example, the number N of depth or time levels included in the block-based data packages is equal to four (M×4), such as 4×4. Data packages are then encoded by the encoder 310 downhole, transmitted as an encoded data stream 502 (i.e., a bit stream) via telemetry, such as mud pulse telemetry, acoustic telemetry, electromagnetic telemetry, and/or wired pipe, from the encoder 310 downhole to the decoder 320 at the surface, and decoded 504 by the decoder 320 at the surface while the drilling process continues. For the presented techniques, decoding by decoder 320 includes generating from the decompressed data blocks, the data structure that was originally compressed, i.e. images, curves, or a combination of both. The drilling process can utilize the resulting real time (RT) images, curves, or a combinations of both (depicted in FIG. 5 as RT logs 506) to improve performance of the drilling assembly (e.g., reservoir navigation, reduce non-production time, geosteering, geostopping, and the like).

Figure 6:
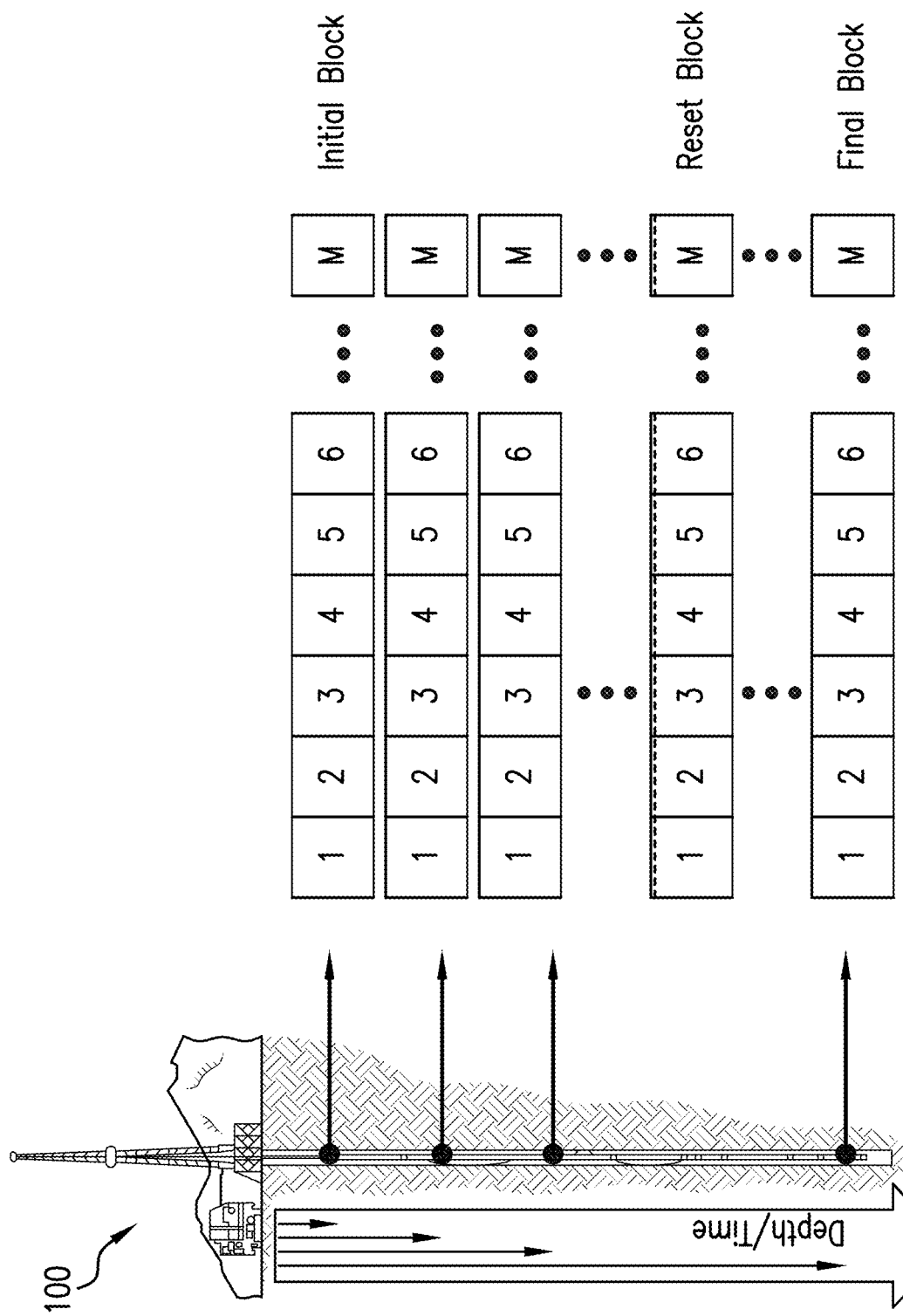
FIG. 6 depicts the wellbore operation of FIG. 1 utilizing the compression techniques according to one or more embodiments described herein.

FIG. 6 depicts the wellbore system 100 of FIG. 1 utilizing the compression techniques according to one or more embodiments described herein. In this example, an M×4 data package is utilized, where M represents a number of 4×4 data blocks and "4" represents the number of time or depth levels in one data block (note that in this case "M" refers to a number of data blocks which is different from how "M" is used in other instances of this application). For example, the data package may comprise a borehole image where each data value is associated with a time level and one of 64 toolface values or toolface intervals (also known as sectors). In this example, M would be 16. Alternatively, the data package may comprise eight resistivity curves wherein each data value is associated with a time level and a curve label that refers to a particular measurement configuration. In this example, M would be 2. In comparison to FIG. 4, the 4×4 data block corresponds to a macroblock and the M×4 data block corresponds to a slice of a block-based data package that can be transmitted and received with a compression-related latency of not less than 4 time (or depth) levels. After buffering an M×4 data package, the data are encoded and transmitted to the surface while drilling continuously progresses.

For compression of one particular 4×4 data block, similarities between neighboring 4×4 data blocks (at the left and right sides of the individual 4×4 data blocks in FIG. 6) and previously transmitted 4×4 data blocks (at the upper side and/or at the upper left and upper right corner of the individual 4×4 data blocks in FIG. 6). are utilized for performing the intra-frame/inter-frame prediction (also known as motion prediction). In other words, the inter-frame/intra-frame prediction uses data values of a first data block to estimate data values of a second data block, wherein the data values of the first data block are transmitted to the earth's surface not later than the data values of the second data block are transmitted to the earth's surface. The 4×4 data blocks that are utilized for performing the intra-frame prediction step are shown as connected by bold lines between the individual 4×4 data blocks in FIG. 6. To keep the compression-related latency short, each M×4 will be sent as soon as the data is acquired and processed/compressed. Hence, data that is not yet acquired or otherwise available will not be utilized for the intra-frame prediction step. This is indicated by thin lines between the individual 4×4 data blocks in FIG. 6. Utilizing intra-frame or inter-frame prediction can be problematic when transmitting/receiving digital information in an environment with low processing power and low telemetry rate as it is typically the case for MWD/LWD applications. For example, in case an error occurred during acquisition and/or the various processing steps of the data values or data blocks, the prediction step may transfer the error to other data values/data blocks or may result in a very inefficient data compression. If sufficient processing power and telemetry rate is available, the erroneous data may simply be reprocessed and/or retransmitted. However, in MWD/LWD applications where processing power and telemetry rate is typically very low (e.g. typical mud pulse telemetry rates may be below 20 bits/s, such as below 10 bits/s or below 5 bits/s down to below 3 bits/s) this may not be an option. To avoid these problems, in MWD/LWD applications so-called reset blocks may be defined that may utilize the neighboring 4×4 data blocks for performing the intra-frame prediction but will not utilize the previously transmitted 4×4 data blocks for performing the intra-frame prediction. Reset blocks may be predefined, for example, at specific intervals (e.g., every k·[M×4] blocks, where k∈[1,2,3, . . . ]). Reset blocks can also be defined based on a condition. For example, if an error occurred during acquisition and/or the various processing steps of the data values or data blocks, the algorithm may react in defining one or more of the next M×4 blocks as reset blocks to avoid transfer of the error to other data values/data blocks and/or avoid inefficient data compression of the other data values/data blocks. It should be appreciated that the data stream depicted in FIG. 6 is not compatible with the H.264 standard because that standard requires 16×16 macroblocks. The present techniques, therefore, provide encoding/compression without underlying 16×16 macroblocks in favor of 4×4 macroblocks and remove any transmitted redundant header overheads (e.g., for motion artifact corrections, i.e. corrections for artifacts of the motion prediction of the video compression algorithms and inter-frame prediction protocols. Transmission of a bit stream to the surface can then be performed using mud pulse telemetry or other similar transmission techniques.

Figure 7:
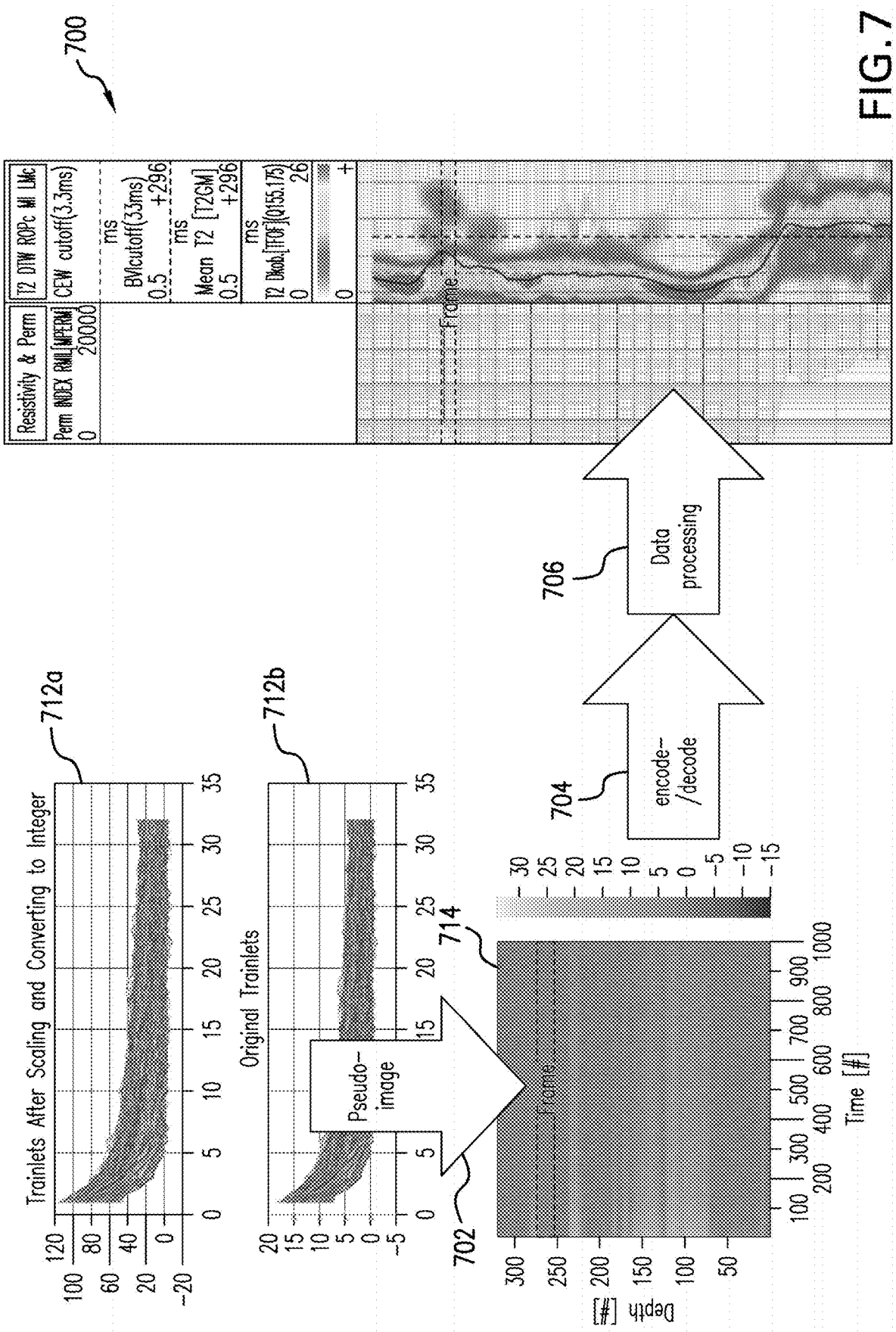
FIG. 7 depicts a workflow for logging while drilling (LWD) data compression based on pseudo-images according to one or more embodiments described herein.

FIG. 7 depicts a workflow 700 for LWD data compression based on pseudo-images according to one or more embodiments described herein. For example, the present techniques can also be applied on a number of logging curves or data that are assembled to a data block, such as an image-like frame A×B (i.e., a pseudo-image), where A is the number of curves and B is the number of depth or time levels. For example, M×B pseudo-images for M resistivity curves, such as propagation resistivity curves (e.g. MPR curves) or induction resistivity curves and B time or depth levels. The M resistivity curves may be different in the configuration that was used to generate the resistivity data values, such as antenna spacings, antenna moment directions, processing scheme to calculate the resistivity, or operating frequency. For example, if the M resistivity curves were acquired with a set of multiple antennae having multiple antenna spacings, each antenna having an individual antenna moment direction and an operating frequency and multiple processing schemes were used to process the acquired data, the M resistivity curves may comprise curves that were generated by a combination of one of the multiple antenna spacings, one of the multiple of antenna moment directions, one of the multiple processing schemes to process the acquired data, and one of the multiple operating frequencies. Another example is a M×B pseudo-image for B NMR echo-trains. NMR echo-trains are generated by exciting the formation with an excitation signal and sensing the decaying echo from the formation that is generated in response to the excitation signal. Exciting the formation by an excitation signal and sensing the echo from the formation at multiple times from the excitation signal results in a so-called echo-train. If the B echo-trains are measured and each of the B echo-trains comprises M data values acquired at M times (e.g. 1000 times) from the corresponding excitation signals, the data values may be represented by a M×B pseudo-image. Another example is a M×B pseudo-image for B acoustic wave trains, such as B acoustic wave trains acquired at B different time levels, depth levels, or receivers, wherein each wave train consists of M data values acquired at M different acquisition times (for example, B may equal 512 acoustic wave traces). These assemblages can be treated as pseudo-images/video frames and can be encoded and decoded accordingly by utilizing the compression techniques described herein.

In FIG. 7, a set of NMR echo-trains 712b is shown that was acquired downhole. The data shown by 712b corresponds to the decay signals in arbitrary units vs. the acquisition time after the excitation signal. The data 712b comprises several curves acquired while drilling at different time or depth levels, each curve comprising 1000 data values. Several processing steps may be applied to the data 712b, such as, but not limited to scaling, converting to integer, and averaging/stacking to generate data set 712a. As shown by arrow 702, NMR echo-trains/trainlets 712a or 712b are assembled into frames of a pseudo-image 714. In pseudo image 714, the horizontal axis represents the acquisition times after excitation and the vertical axis corresponds to the depth level of the excitation signal. This should not be understood as a limitation. The apparatus and methods as described herein are also applicable if the vertical axis of frame 714 corresponds to the time level of the excitation signal. Generally, in the while drilling applications, depth is a function of time and for each time level a corresponding depth level can be determined by methods known in the art. The decay signal is represented by the grayscale intensity in pseudo image 714. Therefore each horizontal line in pseudo-image 714 corresponds to one single curve in the data represented by the set of curves 712a or 712b. Pseudo-image 714 is then subdivided in frames or slices (indicated by the dashed line in pseudo-image 714. In the example of FIG. 7, a single frame or slice of the pseudo-image 714 has 1000 echo data values×4 depth levels. As shown by arrow 704, individual 4×4 data blocks (4 time or depth levels ×4 acquisition times after excitation) of the pseudo-image 714 are encoded downhole (e.g., by the encoder 310), transmitted to the surface, and decoded (e.g., by the decoder 320). Because the frame or slice comprises only four time or depth levels, the compression-related latency of the real-time data corresponds to only four time or depth levels. As shown by arrow 706, the real-time NMR data processing is performed on the decoded echo-trains to obtain NMR relaxation time ($T_2$) distributions and to derive real-time porosity of formation components with a compression-related latency that corresponds to four time or depth levels, for example. In other examples relating to acoustic data, the analysis can derive a semblance map or acoustic wave forms or seismic traces. In yet another example for decoded near-infrared spectroscopy (NIR) spectra, the analysis can provide information on fluid composition. Drilling decisions (e.g., how to control a drilling assembly, identifying hydrocarbon containing section) can be made based on the real-time MPR or NMR data processing results. According to one or more embodiments described herein, the concept of treatment of non-image logging data (e.g., the pseudo-image 714) is not limited to the 4×4 block concept. For example, it may be applied to compression of a single depth level or line of data such as a single curve (e.g. a single resistivity curve). To apply block-based compression to a single curve, one or more synthetic curves may be generated and added to the single curve. For example, to apply a 4×4 block-based compression on a single curve, three additional curves may be generated with the same depth or time levels as the single curves. The three additional curves may consist of any predefined series of data values, such as a constant value for all time and depth levels, or may be a duplicate of the single curve, for example. The single curve and the three additional curves may be used to generate 4×4 blocks based on which a 4×4 block-based compression will be applied.

In the example of FIG. 7, echo-trains having 1000 data values (echos) can be compressed to about <100 bits per depth-level by using the techniques described herein. The present techniques are able to capture linear and non-linear effects (e.g., motion artifacts).

Figure 8:
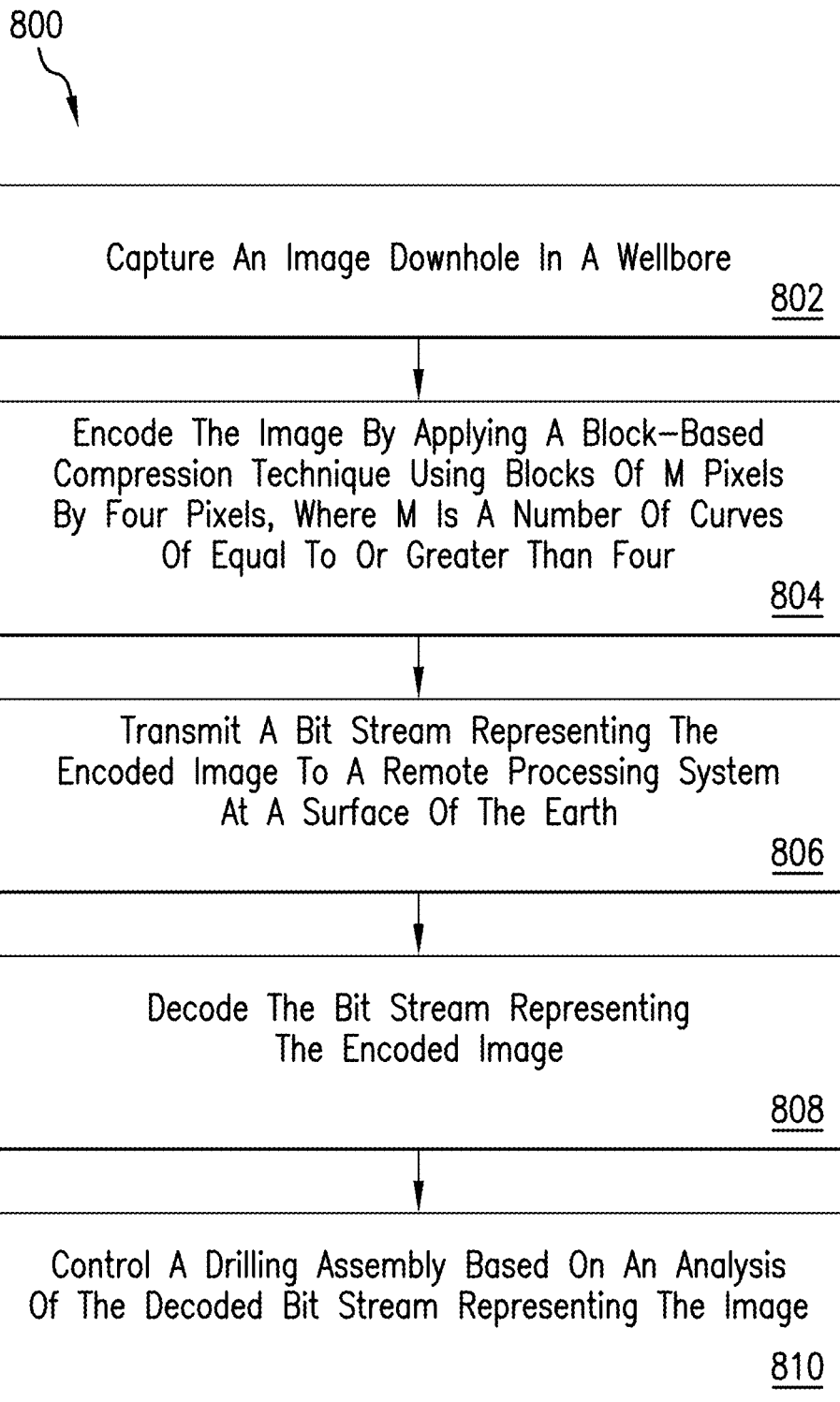
FIG. 8 depicts a flow diagram of a method for image compression according to one or more embodiments described herein.

FIG. 8 depicts a flow diagram of a method 800 for image compression according to one or more embodiments described herein. The method 800 can be performed by any suitable processing device and/or processing system, such as the processing system 12. According to one or more embodiments described herein, the method 800 is performed by the encoder 310 and the decoder 320.

At block 802, an image downhole in a wellbore is captured. The image may an image generated from formation evaluation data (e.g. gamma image, resistivity image, density image, porosity image, acoustic image, as known in the art). In some examples, the image is a pseudo-image generated from an echo-train (i.e., a train of echo data) or other similar non-image data (such as curve data, e.g. formation evaluation data, like spectroscopy data, gamma data, resistivity data, density data).

At block 804, the encoder 310 encodes the image by applying a block-based compression technique using blocks of M pixels by four pixels, where M is a number of curves of equal to or greater than four, corresponding to four depth levels. The encoding can include performing a predicting, a transforming, and a bit encoding using the blocks of four pixels by four pixels. In the case of pseudo-images, the encoding is performed on a frame of the pseudo-image. In some examples, the frame comprises 4 depth levels and 1000 echo data points.

Encoding the image by applying the block-based compression technique using the blocks of M pixels by four pixels is performed without using blocks not M pixels by four pixels (e.g., without using 8×8 blocks or 16×16 blocks). This reduces compression-related latency introduced by traditional H.264 compression techniques. For example compressing the image by applying the block-based compression technique using the blocks of four pixels by four pixels is associated with a first compression-related latency. Similarly, compressing the image by applying an H.264 compression technique is associated with a second compression-related latency. According to one or more embodiments described herein, the second compression-related latency is longer than the first compression-related latency.

At block 806, the encoder 310 transmits a bit stream representing the encoded image to a remote processing system at a surface of the earth. The transmission can occur via mud pulse telemetry, a wireline/powerline, etc.

At block 808, the decoder 320 receives the bit stream and decodes the bit stream representing the encoded image. The decoding can include performing a bit decoding, an inverse transforming, and a reconstruction to generate output data comprising decompressed data values, the output data being a decompressed version of the image or pseudo-image. If the image is a time-based image, a time-depth conversion may be applied as known in the art. For example, after the decompression each of the data values in the image or pseudo-image may be assigned to surface depth level (i.e. a depth level assigned at the earth's surface) to generate a depth based image, a depth-based pseudo-image, or a depth-based data block. The time-based or depth-based data may then be displayed at the earth's surface as an image, a pseudo-image, or one or more curves. For example, if a pseudo-image was communicated comprising a plurality of labelled data sets, the data values of each labelled data set may be plotted separately by connected or interpolated data points, so that data values with different labels appear as different lines, also known as curves.

At block 810, the processing system 12 controls a drilling assembly based on an analysis of the decoded bit stream representing the image. Controlling the drilling assembly based on the analysis of the decoded bit stream representing the image can include adjusting a drilling operation parameter based on the analysis of the decoded image. The drilling operation parameter can include one or more of a weight on bit of a drill bit, a rate of penetration of the drill bit, and/or an angle of inclination, toolface, or azimuth of the drill bit. For example, the analysis may indicate that a rate of penetration of the drill bit should increase and the angle of inclination of the drill bit should decrease (i.e., to be more downward pointing). By controlling the drilling assembly using an analysis of the image, the operation of the drilling assembly can be improved. For example, the drilled well can produce more hydrocarbons than otherwise possible, can reduce non-production time, and the like.

Additional processes also can be included, and it should be understood that the processes depicted in FIG. 8 represent illustrations and that other processes can be added or existing processes can be removed, modified, or rearranged without departing from the scope and spirit of the present disclosure.

Figure 9:
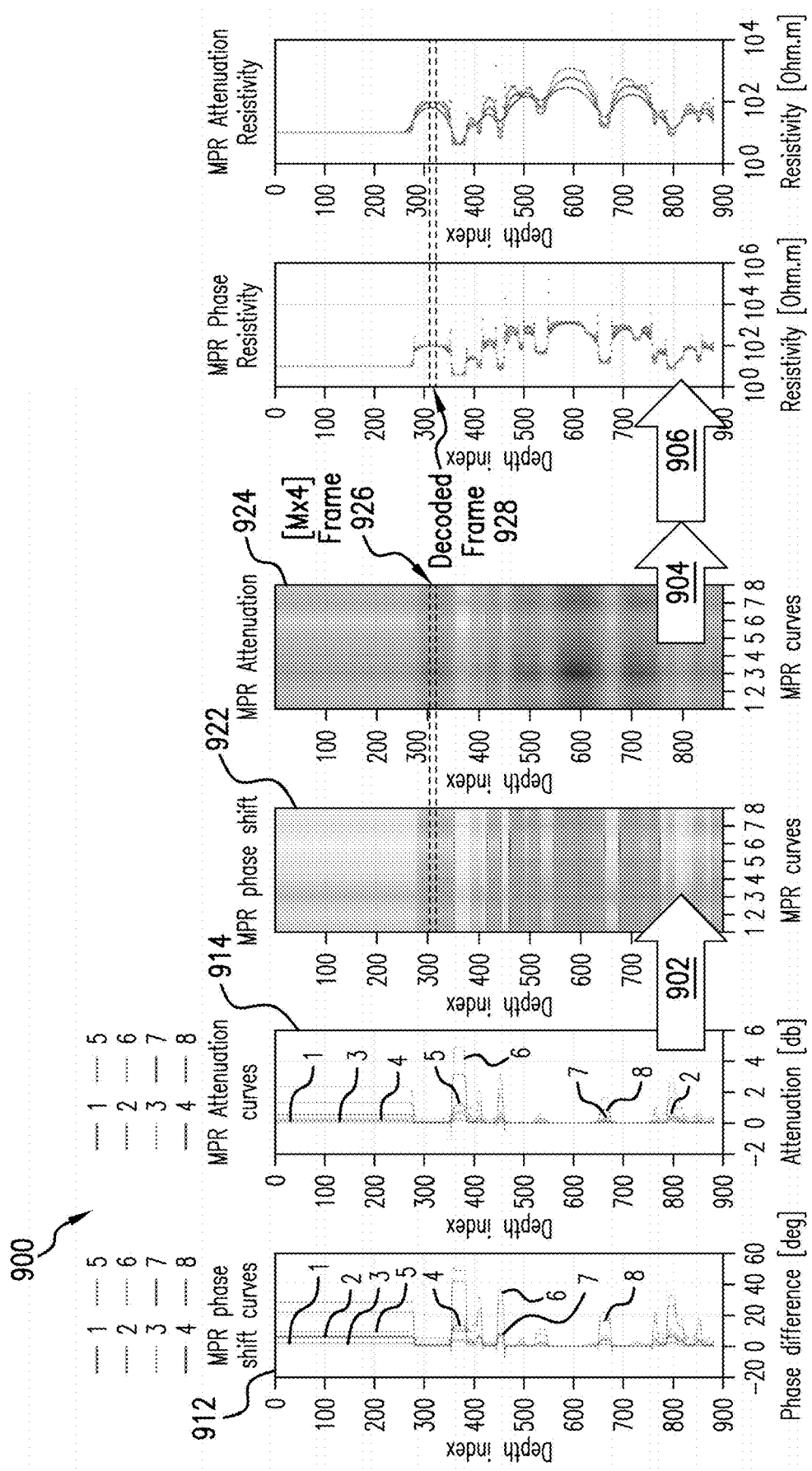
FIG. 9 depicts a workflow for encoding of non-image multi-propagation resistivity (MPR) data as a pseudo-image according to one or more embodiments described herein.

FIG. 9 depicts a workflow 900 for encoding of non-image multi-propagation resistivity (MPR) data as a pseudo-image according to one or more embodiments described herein. Propagation resistivity techniques such as MPR techniques measure the phase differences 912 and amplitude attenuations 914 of electromagnetic waves between one or more transmitter (Tx) and a receiver (Rx) or several receivers at various locations, for example at different frequencies (e.g., 2 MHz and 400 kHz) and various Tx-Rx offsets (see lines 1-8 in FIG. 9). The measured data is related to the signals generated at the receivers and may be converted to apparent resistivity (e.g. in Ohmm), phase difference (e.g. in degree), attenuation (e.g. in decibel), absolute voltages (e.g. in Volts), or real/imaginary parts of absolute voltages (e.g. in Volts), etc. Any of these quantities may be converted to a pseudo-image at arrow 902. For example, the phase differences 912 and the amplitude attenuations 914 are converted to a phase shift pseudo-image 922 and attenuation pseudo-image 924 respectively at arrow 902. Frames of the pseudo-images (such as the M×4 frame 926) are encoded, transmitted, and decoded at arrow 904. Processing is performed on the frame at 906 to generate a decoded frame 928. For example, a conversion from phase differences to resistivity and/or a conversion from attenuation to resistivity may be performed to generate processed curves as shown in FIG. 9.

Set forth below are some embodiments of the foregoing disclosure:

Embodiment 1: A method for image compression, the method comprising: capturing an image downhole in a wellbore; encoding, by a processing system, the image by applying a block-based compression technique using basic blocks of M data values by four data values, where M is a number of curves of equal to or greater than four, corresponding to four depth levels or time levels, the depth levels corresponding to depths downhole in the wellbore or time levels; transmitting, by the processing system, a bit stream representing the encoded image to a remote processing system at a surface of the earth; decoding, by the remote processing system, the bit stream representing the encoded image; and controlling a drilling assembly based on an analysis of the decoded bit stream representing the image.

Embodiment 2: A method according to any prior embodiment, wherein encoding the image by applying the block-based compression technique using the blocks of M pixels by four pixels or more is associated with a first latency, and wherein encoding the image by applying an H.264 compression technique is associated with a second latency, the second latency being longer than the first latency.

Embodiment 3: A method according to any prior embodiment, wherein the encoding comprises performing a predicting, a transforming, and a bit encoding results of the transforming as a bit string using the blocks of four pixels by four pixels.

Embodiment 4: A method according to any prior embodiment, wherein the decoding comprises performing a bit decoding to decode the bit string, an inverse transforming, and a reconstruction to generate output data, the output data being a compressed version of the image.

Embodiment 5: A method according to any prior embodiment, wherein the image comprises a pseudo-image generated from a series of data.

Embodiment 6: A method according to any prior embodiment, wherein the pseudo-image comprises a depth component and a corresponding echo component.

Embodiment 7: A method according to any prior embodiment, wherein the pseudo-image is four depth levels.

Embodiment 8: A method according to any prior embodiment, wherein controlling the drilling assembly based on the analysis of the decoded bit stream representing the image comprises adjusting a drilling operation parameter based on the analysis of the decoded bit stream representing the image.

Embodiment 9: A method according to any prior embodiment, wherein the drilling operation parameter comprises at least one of the parameters selected from the group consisting of a weight on bit of a drill bit, a rate of penetration of the drill bit, and an angle of inclination of the drill bit.

Embodiment 10: A method according to any prior embodiment, wherein encoding the image by applying the block-based compression technique using the blocks of M pixels by four pixels is performed without using blocks not M pixels by four pixels.

Embodiment 11: A system for a memory comprising computer readable instructions; and a processing device for executing the computer readable instructions for performing a method for image compression, the method comprising: generating, by the processing device, a spectroscopy data based at least in part on curve data, the spectroscopy data being in the form A×B, where A is a number of curves and B is a number of depth levels; encoding, by the processing device, the spectroscopy data by applying a block-based compression technique; transmitting, by the processing device, a bit stream representing the encoded spectroscopy data to a remote processing system at a surface of a wellbore; decoding, by the remote processing system, the bit stream representing the encoded spectroscopy data; and controlling a drilling assembly based on an analysis of the decoded bit stream representing the spectroscopy data.

Embodiment 12: A system according to any prior embodiment, wherein the spectroscopy data comprises a pseudo-image, and wherein the encoding is performed on a subset-image of the pseudo-image.

Embodiment 13: A system according to any prior embodiment, wherein the analysis of the decoded bit stream representing the pseudo-image generates a $T_2$ distribution and derived porosity components of the curve data.

Embodiment 14: A system according to any prior embodiment, wherein the analysis of the decoded bit stream representing the spectroscopy data generates a semblance map or acoustic first arrival waves.

Embodiment 15: A system according to any prior embodiment, wherein the analysis of the decoded bit stream representing the spectroscopy data generates fluid composition information.

Embodiment 16: A system according to any prior embodiment, wherein controlling the drilling assembly based on the analysis of the decoded bit stream representing the spectroscopy data comprises adjusting a drilling operation parameter based on the analysis of the decoded spectroscopy data, and wherein the drilling operation parameter comprises at least one of the parameters selected from the group consisting of a weight on bit of a drill bit, a rate of penetration of the drill bit, and an angle of inclination of the drill bit.

Embodiment 17: A method for transmitting data from a downhole location to the earth's surface, the method comprising: conveying a drilling assembly to the downhole location, the drilling assembly including a drill bit to penetrate an earth formation and one or more sensors; sensing, with the one or more sensors, sensor data downhole, the sensor data comprising a plurality of data value sets; assigning at least one data value of each of the plurality of data value sets to each of a plurality of time levels or depth levels to generate a data block; compressing, with a first processor in the drilling assembly, the data block by a block-based compression technique to generate compressed data; transmitting with a telemetry system in the drilling assembly, the compressed data from the downhole location to the earth's surface; decompressing, with a second processor at the earth's surface, the compressed data to generate decompressed data values; and controlling the drilling assembly based on the decompressed data values.

Embodiment 18: A method according to any prior embodiment, further comprising assigning each of the decompressed data values to a surface depth level to generate a depth-based data block.

Embodiment 19: A method according to any prior embodiment, wherein the plurality of data value sets comprise a first data value set associated with a first data value set label and a second data value set associated with a second data value set label, wherein the first data value set label and the second data value set label are different.

Embodiment 20: A method according to any prior embodiment, wherein the first data value set label and the second data value set label refer to at least one of i) the one or more sensors, ii) an operating frequency of the one or more sensors, iii) a transmitter-receiver distance of the one or more sensors, iv) a toolface angle or toolface angle interval, v) a running number for a series of consecutively sensed data values, and vi) a measurement time or a measurement time interval.

Embodiment 21: A method according to any prior embodiment, wherein the block-based compression technique comprises at least one of i) a jpeg compression, ii) a discrete cosine transform, and iii) a video compression technique.

Embodiment 22: A method according to any prior embodiment, wherein the video compression technique comprises a motion prediction based on the data blocks, wherein each of the data blocks comprises 64 data values or less.

Embodiment 23: A method according to any prior embodiment, further comprising: displaying at the earth's surface the first data value set as a first curve and the second data value set as a second curve.

Embodiment 24: A method for transmitting data from a downhole location to the earth's surface, the method comprising: conveying a drilling assembly to the downhole location, the drilling assembly including a drill bit to penetrate an earth formation and one or more sensors; sensing, with the one or more sensors, sensor data downhole, the sensor data comprising an one or more images; compressing, with a first processor in the drilling assembly, the one or more images by a video compression technique to generate compressed data; transmitting with a telemetry system in the drilling assembly, the compressed data from the downhole location to the earth's surface; decompressing, with a second processor at the earth's surface, the compressed data by a video decompression technique to generate decompressed data values; and controlling the drilling assembly based on the decompressed data values.

Embodiment 25: A method according to any prior embodiment, wherein the video compression technique comprises a motion prediction based on data blocks, wherein each of the data blocks comprises 64 data values or less.

Embodiment 26: A method according to any prior embodiment, wherein each of the data blocks comprises 16 data values or less.

Embodiment 27: A method according to any prior embodiment, wherein the video compression technique comprises a motion prediction, wherein the motion prediction uses data values of a first data block to estimate data values of a second data block, wherein the data values of the first data block are transmitted to the earth's surface not later than the data values of the second data block are transmitted to the earth's surface.

Embodiment 28: A method according to any prior embodiment, wherein the data values of the first data block are transmitted to the earth's surface not before the data values of the second data block are transmitted to the earth's surface.

Embodiment 29: A method according to any prior embodiment, wherein the one or more sensors sense the sensor data at a measurement time interval and wherein the video compression technique creates a compression-related latency that is lower than 16 times the measurement time interval.

Embodiment 30: A method according to any prior embodiment, wherein the one or more images comprise one or more pseudo-images, the one or more pseudo-images comprising a first data value set associated with a first data value set label and a second data value set with a second data value set label and wherein the first data value set label and the second data value set label refer to at least one of i) the one or more sensors, ii) an operating frequency of the one or more sensors, iii) a transmitter-receiver distances of the one or more sensors, iv) a toolface angle or toolface angle interval, v) a running number for a series of consecutively acquired data values, and vi) a measurement time or a measurement time interval.

Embodiment 31: A system for transmitting data from a downhole location to the earth's surface, the system comprising: a drilling assembly at the downhole location, the drilling assembly including a drill bit to penetrate an earth formation; one or more sensors in the drilling assembly, the one or more sensors configured to sense sensor data downhole, the sensor data comprising a plurality of data value sets; a first processor in the drilling assembly, the first processor configured to Assign at least one data value of each of the plurality of data value sets to each of a plurality of time levels or depth levels to generate a data block and to compress the data block by a block-based compression technique to generate compressed data; a telemetry system in the drilling assembly configured to transmit the compressed data from the downhole location to the earth's surface; and a second processor at the earth's surface configured to decompress the compressed data to generate decompressed data values;

Embodiment 32: A system according to any prior embodiment, wherein the plurality of data value sets comprising a first data value set associated with a first data value set label and a second data value set associated with a second data value set label, wherein the first data value set label and the second data value set label are different and wherein the first data value set label and the second data value set label refer to at least one of i) the one or more sensors, ii) an operating frequency of the one or more sensors, iii) a transmitter-receiver distances of the one or more sensors, iv) a toolface angle or toolface angle interval, v) a running number for a series of consecutively sensed data values, and vi) a measurement time or a measurement time interval.

Embodiment 33: A system according to any prior embodiment, further comprising a display at the earth's surface configured to display the first data value set as a first curve and the second data value set as a second curve.

Embodiment 34: A system for transmitting data from a downhole location to the earth's surface, the system comprising a drilling assembly at the downhole location, the drilling assembly including a drill bit to penetrate an earth formation; one or more sensors configured to sense sensor data downhole, the sensor data comprising one or more images; a first processor in the drilling assembly, the first processor configured to compress the one or more images by a video compression technique to generate compressed data; a telemetry system in the drilling assembly, configured to transmit the compressed data from the downhole location to the earth's surface; and a second processor at the earth's surface configured to decompress the compressed data by a video decompression technique to generate decompressed data values;

Embodiment 35: A system according to any prior embodiment, wherein the one or more sensors sense the sensor data at a measurement time interval and wherein the video compression technique creates a compression-related latency that is lower than 16 times the measurement time interval.

Embodiment 36: A system according to any prior embodiment, wherein the video compression technique comprises a motion prediction, the motion prediction uses data values of a first data block to estimate data values of a second data block, wherein the data values of the first data block are transmitted to the earth's surface not later than the data values of the second data block are transmitted to the earth's surface The use of the terms "a" and "an" and "the" and similar referents in the context of describing the present disclosure (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure can be used in a variety of well operations. These operations can involve using one or more treatment agents to treat a formation, the fluids resident in a formation, a wellbore, and/or equipment in the wellbore, such as production tubing. The treatment agents can be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the present disclosure has been described with reference to an exemplary embodiment or embodiments, it will be understood by those skilled in the art that various changes can be made and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A method for transmitting data from a downhole location to the earth's surface, the method comprising:
   conveying a drilling assembly to the downhole location, the drilling assembly including a drill bit to penetrate an earth formation and one or more sensors;
   sensing, with the one or more sensors, sensor data downhole, the sensor data comprising a plurality of data value sets;
   assigning at least one data value of each of the plurality of data value sets to each of a plurality of time levels or depth levels to generate a data block;
   compressing, with a first processor in the drilling assembly, the data block by a block-based compression technique to generate compressed data;
   transmitting, with a telemetry system in the drilling assembly, the compressed data from the downhole location to the earth's surface;
   decompressing, with a second processor at the earth's surface, the compressed data to generate decompressed data values;
   assigning each of the decompressed data values to a surface depth level to generate a depth-based data block; and
   controlling the drilling assembly based on the decompressed data values.

2. The method of claim 1, wherein the plurality of data value sets comprise a first data value set associated with a first data value set label and a second data value set associated with a second data value set label, wherein the first data value set label and the second data value set label are different.

3. The method of claim 2, wherein the first data value set label and the second data value set label refer to at least one of i) the one or more sensors, ii) an operating frequency of the one or more sensors, iii) a transmitter-receiver distance of the one or more sensors, iv) a toolface angle or toolface angle interval, v) a running number for a series of consecutively sensed data values, and vi) a measurement time or a measurement time interval.

4. The method of claim 1, wherein the block-based compression technique comprises at least one of i) a jpeg compression, ii) a discrete cosine transform, and iii) a video compression technique.

5. The method of claim 4, wherein the video compression technique comprises a motion prediction based on the data blocks, wherein each of the data blocks comprises 64 data values or less.

6. The method of claim 2, further comprising:
   displaying at the earth's surface the first data value set as a first curve and the second data value set as a second curve.

7. A method for transmitting data from a downhole location to the earth's surface, the method comprising:
   conveying a drilling assembly to the downhole location, the drilling assembly including a drill bit to penetrate an earth formation and one or more sensors;
   sensing, with the one or more sensors, sensor data downhole, the sensor data comprising an one or more images;
   compressing, with a first processor in the drilling assembly, the one or more images by a video compression technique to generate compressed data;
   transmitting, with a telemetry system in the drilling assembly, the compressed data from the downhole location to the earth's surface;
   decompressing, with a second processor at the earth's surface, the compressed data by a video decompression technique to generate decompressed data values;
   assigning each of the decompressed data values to a surface depth level to generate a depth-based data block; and
   controlling the drilling assembly based on the decompressed data values.

8. The method of claim 7, wherein the video compression technique comprises a motion prediction based on data blocks, wherein each of the data blocks comprises 64 data values or less.

9. The method of claim 8, wherein each of the data blocks comprises 16 data values or less.

10. The method of claim 7, wherein the video compression technique comprises a motion prediction, wherein the motion prediction uses data values of a first data block to estimate data values of a second data block, wherein the data values of the first data block are transmitted to the earth's surface not later than the data values of the second data block are transmitted to the earth's surface.

11. The method of claim 10, wherein the data values of the first data block are transmitted to the earth's surface not before the data values of the second data block are transmitted to the earth's surface.

12. The method of claim 7, wherein the one or more sensors sense the sensor data at a measurement time interval and wherein the video compression technique creates a compression-related latency that is lower than 16 times the measurement time interval.

13. The method of claim 7, wherein the one or more images comprise one or more pseudo-images, the one or more pseudo-images comprising a first data value set associated with a first data value set label and a second data value set with a second data value set label and wherein the first data value set label and the second data value set label refer to at least one of i) the one or more sensors, ii) an operating frequency of the one or more sensors, iii) a transmitter-receiver distance of the one or more sensors, iv) a toolface angle or toolface angle interval, v) a running number for a series of consecutively acquired data values, and vi) a measurement time or a measurement time interval.

14. A system for transmitting data from a downhole location to the earth's surface, the system comprising:
a drilling assembly at the downhole location, the drilling assembly including a drill bit to penetrate an earth formation;
one or more sensors in the drilling assembly, the one or more sensors configured to sense sensor data downhole, the sensor data comprising a plurality of data value sets;
a first processor in the drilling assembly, the first processor configured to assign at least one data value of each of the plurality of data value sets to each of a plurality of time levels or depth levels to generate a data block and to compress the data block by a block-based compression technique to generate compressed data;
a telemetry system in the drilling assembly configured to transmit the compressed data from the downhole location to the earth's surface; and
a second processor at the earth's surface configured to decompress the compressed data to generate decompressed data values and to assign each of the decompressed data values to a surface depth level to generate a depth-based data block.

15. The system of claim 14, wherein the plurality of data value sets comprise a first data value set associated with a first data value set label and a second data value set associated with a second data value set label, wherein the first data value set label and the second data value set label are different and wherein the first data value set label and the second data value set label refer to at least one of i) the one or more sensors, ii) an operating frequency of the one or more sensors, iii) a transmitter-receiver distance of the one or more sensors, iv) a toolface angle or toolface angle interval, v) a running number for a series of consecutively sensed data values, and vi) a measurement time or a measurement time interval.

16. The system of claim 14, further comprising:
a display at the earth's surface configured to display the first data value set as a first curve and the second data value set as a second curve.

17. A system for transmitting data from a downhole location to the earth's surface, the system comprising:
a drilling assembly at the downhole location, the drilling assembly including a drill bit to penetrate an earth formation;
one or more sensors configured to sense sensor data downhole, the sensor data comprising one or more images;
a first processor in the drilling assembly, the first processor configured to compress the one or more images by a video compression technique to generate compressed data;
a telemetry system in the drilling assembly, configured to transmit the compressed data from the downhole location to the earth's surface; and
a second processor at the earth's surface configured to decompress the compressed data by a video decompression technique to generate decompressed data values and to assign each of the decompressed data values to a surface depth level to generate a depth-based data block.

18. The system of claim 17, wherein the one or more sensors sense the sensor data at a measurement time interval and wherein the video compression technique creates a compression-related latency that is lower than 16 times the measurement time interval.

19. The system of claim 17, wherein the video compression technique comprises a motion prediction, the motion prediction uses data values of a first data block to estimate data values of a second data block, wherein the data values of the first data block are transmitted to the earth's surface not later than the data values of the second data block are transmitted to the earth's surface.

* * * * *